Nov. 16, 1971     E. FISCHBACK     3,619,955
GRINDING ATTACHMENTS FOR SURFACE GRINDERS
Filed June 12, 1970     2 Sheets-Sheet 1
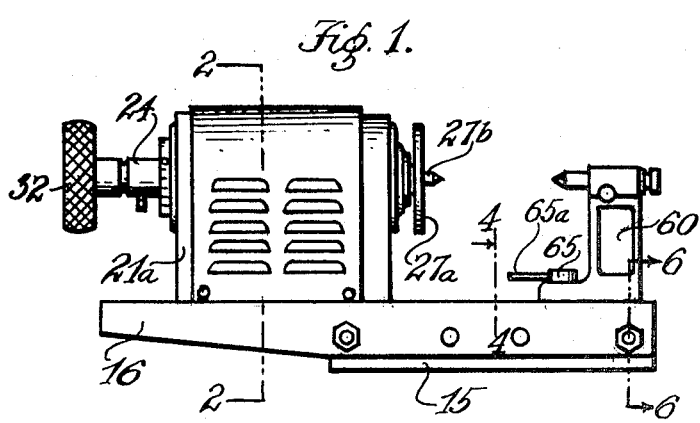
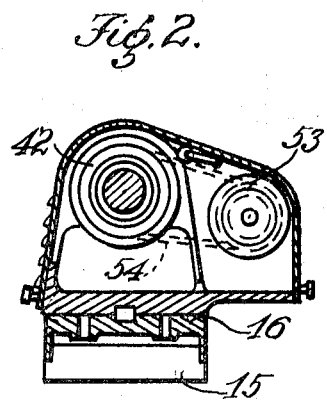
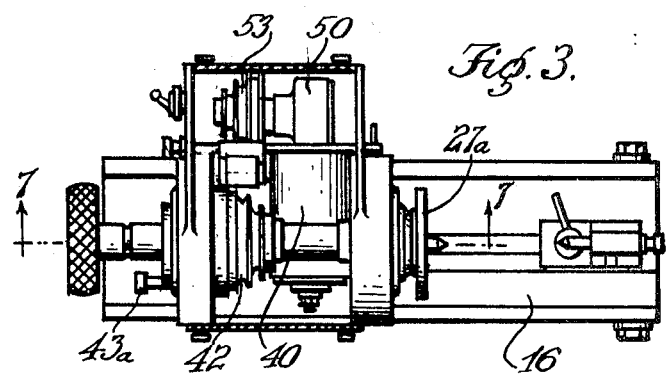
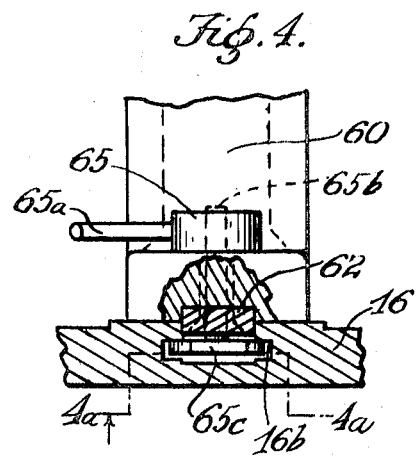
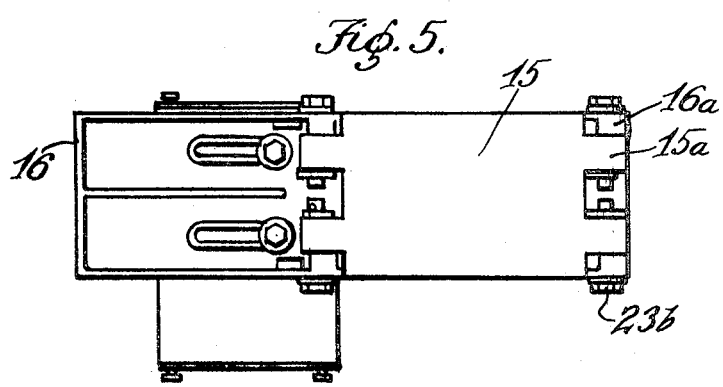
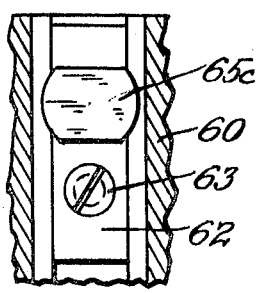
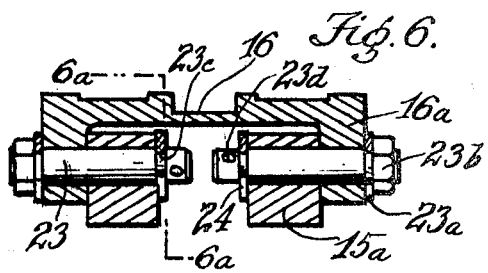
Inventor
Eric Fischback
By Stevens, Davis + Stevens
Attorneys

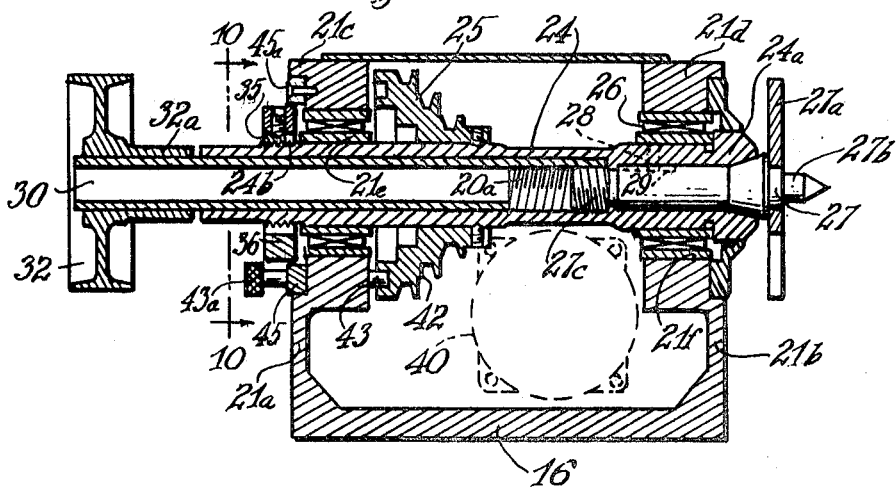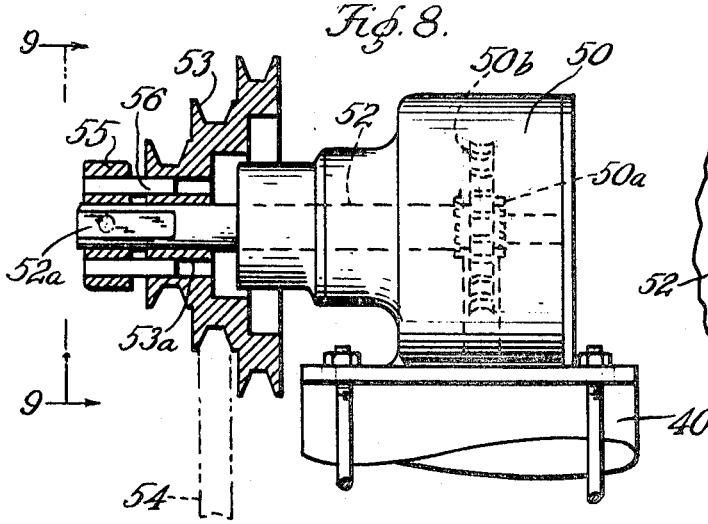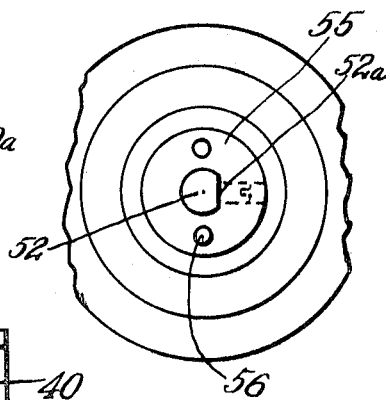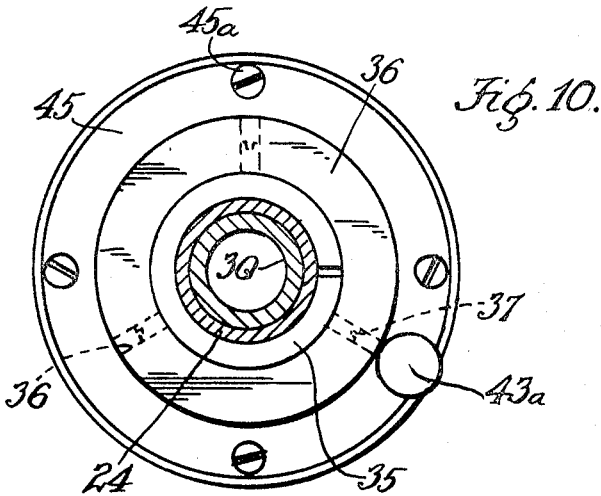

United States Patent Office 3,619,955
Patented Nov. 16, 1971

3,619,955
GRINDING ATTACHMENTS FOR SURFACE GRINDERS
Eric Fischback, Hammond, Ind.
(928 E. Broadway, Bradley, Ill. 60915)
Filed June 12, 1970, Ser. No. 45,769
Int. Cl. B24b 5/04
U.S. Cl. 51—237                                    7 Claims

ABSTRACT OF THE DISCLOSURE

A rotatable work attachment for a surface grinder. This type of attachment has a draw-spindle journaled in bearings and carrying a center pin. The present draw-spindle is threaded where it passes through an inner bearing journal to receive a split nut; and the latter is encircled by a ring with a cluster of screws directed to the periphery of the nut to tighten the same on the draw-spindle after the nut has been advanced to the journal. The attachment also has easily changeable bolt connections at the bottom, a self-alining driving pulley, and a more durable base connection in a tail stock.

My invention relates to devices which are attachable to surface grinders for positioning work at various angles for engagement by the grinding wheel. The invention is particularly an improvement on the device covered in Pat. No. 2,645,067.

One object of the present improvement is to incorporate means connecting the table of the device and its base, which make it easier to assemble these parts or take them apart.

A further object is to incorporate an element in the tail stock of the device which adds durability and maintains accuracy between the tail stock and its support.

Another object is to provide a draw-spindle installation which is easy to adjust.

An additional object is to provide a simple indexing pin for locking the draw-spindle against rotation.

A still further object is to provide a reliable locking device for a reduction-drive pulley.

A better understanding of the invention may be gained by reference to the accompanying drawings, in which—

FIG. 1 is a front elevation of the device;
FIG. 2 is a section on the line 2—2 of FIG. 1;
FIG. 3 is a top plan view of the showing in FIG. 1, with the cover of the device removed;
FIG. 4 is a magnified section of a tail stock base-joint taken on the line 4—4 of FIG. 1;
FIG. 4a is a section on the line 4a—4a of FIG. 4, partly broken away;
FIG. 5 is a bottom plan view of the showing in FIG. 1;
FIG. 6 is an enlarged section on the line 6—6 of FIG. 1;
FIG. 6a is an enlarged section on the line 6a—6a of FIG. 6;
FIG. 7 is an enlarged section on the line 7—7 of FIG. 3;
FIG. 8 is a magnified duplication of the left-hand upper portion of FIG. 3, partly in section;
FIG. 9 is a section on the line 9—9 of FIG. 8; and
FIG. 10 is an enlarged section on the line 10—10 of FIG. 7.

Referring specifically to the drawings, 15 denotes the base of the device and 16 the table over the same, these parts corresponding to the base 10 and the table 21 in the patent first referred to. FIGS. 1, 5 and 6 show that the base 15 has upward webs 15a overlapped by downward webs 16a from the table 16. Cross-bolts 23 are employed for connecting the upward webs with the downward ones, such cross-bolts receiving washers 23a and nuts 23b on their outer ends. The cross-bolts have no heads at their inner ends, but have an annular groove 23c straddled by a horseshoe washer 24. Also, the inner end-portions of the cross-bolts have cross-bores 23d. The construction of the cross-bolts just mentioned enables any cross-bolt to be installed or removed without taking out the opposite one to make room. Thus, when a cross-bolt is to be installed, it is simply inserted from the outside without carrying any added parts. The horseshoe washer is then mounted to fit over the groove 23c. Now, while a hand-pin is inserted through the cross-bore 23d to keep the cross-bolt from turning, the washer 23a and the nut 23b are applied from the outside and the nut turned tight. The cross-bolts are therefore easy to insert or remove.

The device is built up from the table 21 with side walls 21a and 21b which carry outer journals 21c and 21d. FIG. 7 shows the draw-spindle at 24 and its head at 24a, and roller bearings 25 and 26 receiving the draw-spindle in inner journals 21e and 21f. The draw-spindle receives the center pin 27 in its head 24a with a pin and key-slot 28–29 to allow the center pin to be slid in the draw-spindle without turning; and the center pin carries the usual drive plate 27a to secure the work (not shown) on the point 27b of the center pin.

The draw-spindle 24 carries a tight sleeve 30 on the inside, the sleeve being tapped at 20a to receive the threaded inner portion 27c of the center pin. The sleeve 30 extends from the opposite end of the draw-spindle to tightly receive the hub 32a of an external knob 32. FIG. 7 shows that the drawing-spindle is threaded at 24b to receive a split nut 35; and the latter is encircled by a ring 36 which is tapped in three circularly-spaced places as indicated at 36—see FIG. 10—to receive radial set screws 37. Thus, turning the knob 32 clockwise as the draw-spindle 27a is held still will draw on the center pin 27 to seat it in the outer end of the draw-spindle 24. When this fit is made tight, the split nut 35 is advanced to seat against the inner journal 21e of the bearing 25 while the head portion 24a of the draw-spindle bears against the inner journal 21f of the bearing 26. The screws 27 are now advanced to tighten the nut 35 on the draw-spindle, locking the same against endwise motion.

The draw-spindle is designed for rotation when an electric motor 40 mounted on the table 16 is put in motion. FIG. 7 shows that the draw-spindle carries a variable-speed pulley 42. Ordinarily this pulley is free to turn with the draw-spindle. However, when this is not desired—such as during the time when work is mounted in or removed from the device, or when the center pin 27 is adjusted by turning the knob 32—a locking pin 43 formed with an external knob 43a is used to seat the large end of the pulley 42 and stop it against rotation. According to FIGS. 7 and 10, the locking pin carried by a large ring 45 which receives screws 45a to fasten it to the journal 21c.

FIGS. 3 and 8 show that the motor 40 is extended at one side with a gear box containing a worm and gear drive 50a–50b extended with a shaft 52. The latter carries a variable-speed pulley 53 situated in line with the draw-spindle pulley 42 and adapted to drive it by means of a belt 54. A unique way to fix the pulley 53 on the shaft 52 is shown in FIG. 8, the same involving a ring 55 slidable on the end of the shaft. The ring projects two diametrically-spaced pins 56 into bores 53a made in the pulley; and the shaft is made with a flat side 52a to receive a set screw 58 threaded into the ring 55 as shown in FIG. 9. This makes the ring tight on the shaft. Yet the pulley 53 can slide to a limited extent on the shaft to self-aline it with the drive pulley 42.

The tail stock of the device is shown at 60 in FIGS. 1, 3 and 4. Usually, the tail stock is case with a bottom key which is slidable in a groove made in the table 16. However, such a key wears over a period of use and becomes loose in the groove, so that the tail stock may be out of line when made fast. In the present case the key is a strip 62 of hard steel, secured to the tail stock by a flush-headed screw 63. The clamp for the tail stock is shown at 65, and extends with a hand lever 65a. The clamp has a spindle 65b threaded through the tail stock and the key 62 to carry a cam 65c. The table groove 16a is undercut at 16b—as seen in FIGS. 4 and 4a—so that turning the clamp 65 by means of the lever 65a to draw upon the cam 65c and position it crosswise as shown will lock the tailstock to the table.

It will now be apparent that the present grinding device has a number of novel and advantageous features. First, the cross-bolts securing the table 16 to the base 15 are individually insertible or removable from the outside, and receive the easily insertible horseshoe washers which serve in the manner of heads at the inner ends of the cross-bolts. Further, the draw-spindle installation receives a split nut which is free to be advanced along the draw-spindle to lock the same against end-play, and to be made fast on the draw-spindle by advancing the set screws 37. When this has been done, advancing the locking pin 43 and rotating the handknob 32 clockwise will draw the center pin 27 into tight engagement with the head of the draw-spindle in order to turn with the same. Further, the locking pin 43 for the pulley 42 is carried by a face ring 45, which is securely attached to the journal 21c by means of the screws 45a. Further, the variable-speed pulley 53 receives a broad and removable connection with its shaft 52. Finally, the tail stock receives a key-insert in its base which withstands wear and keeps the adjustments of the tail stock in alinement. These features combine to lend the present grinding device improved efficiency and durability.

I claim:

1. A grinding attachment for surface grinders having a base, table secured on the latter, a draw-spindle journaled on the table and threaded through a journal component, a split nut threaded on the draw-spindle to bear on said component, a ring encircling the nut and having tapped bores in radial directions toward the periphery of the nut, and screws threaded through said bores to tighten the nut on the draw-spindle.

2. The structure of claim 1, the base having upward webs at the sides, companion webs for said webs depending from the table, a bolt passing through each pair of webs to receive a nut on the outer end, the inner end formed with a peripheral groove, and a horseshoe washer straddling the latter to serve as a removable head for said inner end.

3. The structure of claim 1, the base having upward webs at the sides, companion webs for said webs depending from the table, a bolt passing through each pair of webs to receive a nut on the outer end, the inner end formed with a peripheral groove, and a horseshoe washer straddling the latter to serve as a removable head for said inner end, the latter extended and transversely perforated for the insertion of a pin to hold the bolt against rotation when the nut is rotated.

4. The structure of claim 1, a drive for the draw-spindle terminating with a shaft, a driving pulley slidable on the latter and having diametrically-spaced bores parallel to the shaft, and a ring fixed on the shaft and projecting pins into said bores to render the pulley rotatable with the shaft and laterally shiftable to be self-alining with a driven pulley.

5. The structure of claim 1, a drive for the draw-spindle terminating with a shaft, a driving pulley slidable on the latter and having diametrically-spaced bores parallel to the shaft, and a ring fixed on the shaft and projecting pins into said bores to render the pulley rotatable with the shaft and laterally-shiftable to be self-alining with a driven pulley, the shaft having a flat portion for a set screw driven from the ring to the shaft to fix the ring on the latter.

6. The structure of claim 1, a tail stock of cast metal mounted on said table over a keyway in the same, and a hard metal strip carried by the tail stock underneath to serve as a key in said keyway.

7. The structure of claim 1, a tail stock of cast metal mounted on said table over a keyway in the same, a hard metal strip carried by the tail stock underneath to serve as a key in said keyway, and a flush-headed screw securing the strip to the tail stock.

References Cited
UNITED STATES PATENTS

| | | | |
|---|---|---|---|
| 2,645,067 | 7/1953 | Hinderer | 51—237 |
| 2,436,535 | 7/1948 | Walther | 51—232 |
| 3,120,725 | 2/1964 | Milewski | 51—237 |
| 2,958,167 | 11/1960 | Mueller | 51—232 |

HAROLD D. WHITEHEAD, Primary Examiner